USOO5690221A

United States Patent [19]
Yeh

[11] Patent Number: 5,690,221
[45] Date of Patent: Nov. 25, 1997

[54] CD BANK

[76] Inventor: Sheng-Fu Yeh, P.O. Box 82-144, Taipei, Taiwan

[21] Appl. No.: 758,578

[22] Filed: Dec. 3, 1996

[51] Int. Cl.$^6$ .................................................. B65D 85/30
[52] U.S. Cl. .................. 206/308.1; 206/309; 312/9.16; 312/111
[58] Field of Search ................ 206/308.1, 309–311, 206/312; 312/9.64, 9.16, 9.27, 9.31, 111, 107, 198

[56] References Cited

U.S. PATENT DOCUMENTS

| | | | |
|---|---|---|---|
| 4,875,743 | 10/1989 | Gelardi et al. | 206/309 |
| 5,244,084 | 9/1993 | Chan | 206/309 |
| 5,332,086 | 7/1994 | Chuang | 206/308.3 |
| 5,617,950 | 4/1997 | Chung | 206/309 |

*Primary Examiner*—Paul T. Sewell
*Assistant Examiner*—Nhan T. Lam
*Attorney, Agent, or Firm*—Alfred Lei

[57] ABSTRACT

A CD bank including a rectangular casing having an upper portion and a lower portion engaged with the upper portion, the lower portion being formed at a lower edge with pairs of ears, each pair of the ears being provided with two opposite protuberances, a plurality of holders pivotally connected with a lower edge of the lower portion, each of the holders being symmetric in structure at both sides thereof and being formed with a through hole adapted to be fitted between the protuberances of a respective pair of the ears, each side of the holder being formed with a half-round recess of a diameter slightly longer than that of an compact disk, an opening at a central portion of the holder for facilitating removal of a compact disk, a plurality of retaining lugs suspending above the half-round recess and spaced around a periphery thereof and having a beveled edge facing inwards, a plurality of triangular projections spaced around the periphery and having a beveled edge facing outwards, a projection at a top of the holder adapted to engage with a cavity of the upper portion, and a protrusion below the protuberance, whereby the individual compact disks can be stored in the CD bank without an individual packing case.

3 Claims, 5 Drawing Sheets

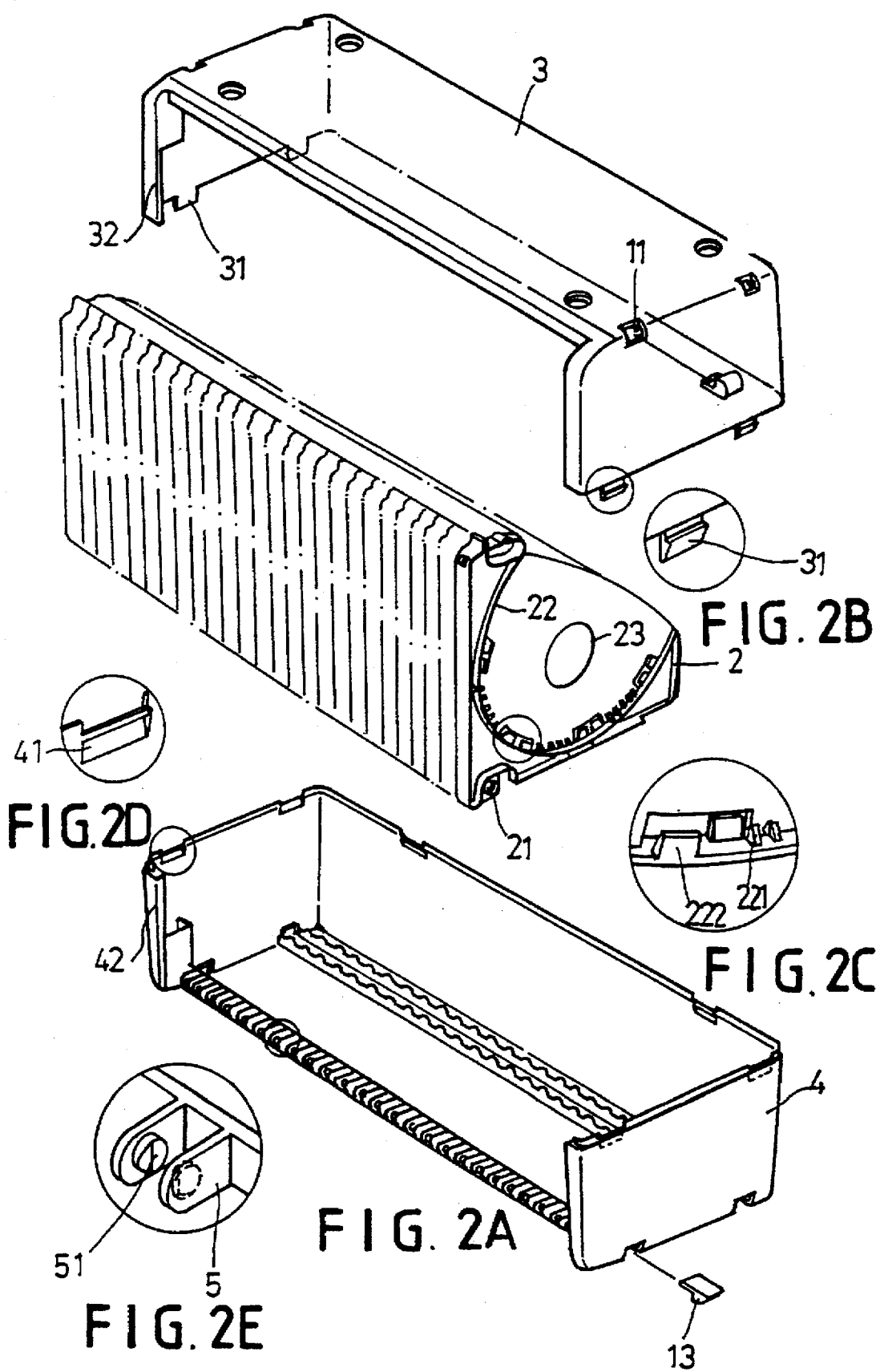

CD BANK

BACKGROUND OF THE INVENTION

1. Field of the Invention

This invention relates to a CD bank for keeping compact disks in good order and in particular to one which is convenient to use.

2. Description of the Prior Art

It has been found that the conventional CD case utilizes a circular retainer A (see FIG. 7) to keep a compact disk in place and so it is necessary to press the retainer in order to take a compact disk out of the case thereby causing much inconvenience in use. Furthermore, various CD storage cases and racks have been disclosed for keeping compact disks (see FIGS. 8 and 9) and have appeared on the market. These CD storage means are designed to hold individual compact disk cases. When to play an individual compact disk, one shall have to pick up the respective individual compact disk cases from the compact disk storage means, and then to open the individual compact disk case so as to pick up the desired individual compact disk. Nevertheless, such CD storage cases are very inconvenient to use and therefore, it is an object of the present invention to provide an improved CD bank which can obviate and mitigate the above-mentioned drawbacks.

SUMMARY OF THE INVENTION

This invention relates to a CD bank for keeping compact disks in good order and in particular to one which is convenient to use.

It is the primary object of the present invention to provide an improved CD bank which has individual holder means to hold individual compact disks so that the individual compact disks can be stored in the CD bank without an individual packing case.

It is another object of the present invention to provide an improved CD bank which is convenient to use.

It is still another object of the present invention to provide an improved CD bank which can easily connected with similar CD banks.

It is still another object of the present invention to provide an improved CD bank which is simple in construction.

It is a further object of the present invention to provide an improved CD bank which is economic to produce.

Other objects of the invention will in part be obvious and in part hereinafter pointed out.

The invention accordingly consists of features of constructions and method, combination of elements, arrangement of parts and steps of the method which will be exemplified in the constructions and method hereinafter disclosed, the scope of the application of which will be indicated in the claims following.

BRIEF DESCRIPTION OF THE DRAWINGS

FIG. 2A is an exploded view of the present invention;

FIG. 2B illustrates the structure of the hook-like member;

FIG. 2C illustrates the retaining lugs and triangular projections;

FIG. 2D illustrates the recesses at the upper edge of the lower portion of the casing;

FIG. 2E illustrates the structure of the ears;

DETAILED DESCRIPTION OF THE PREFERRED EMBODIMENT

Figure 1:
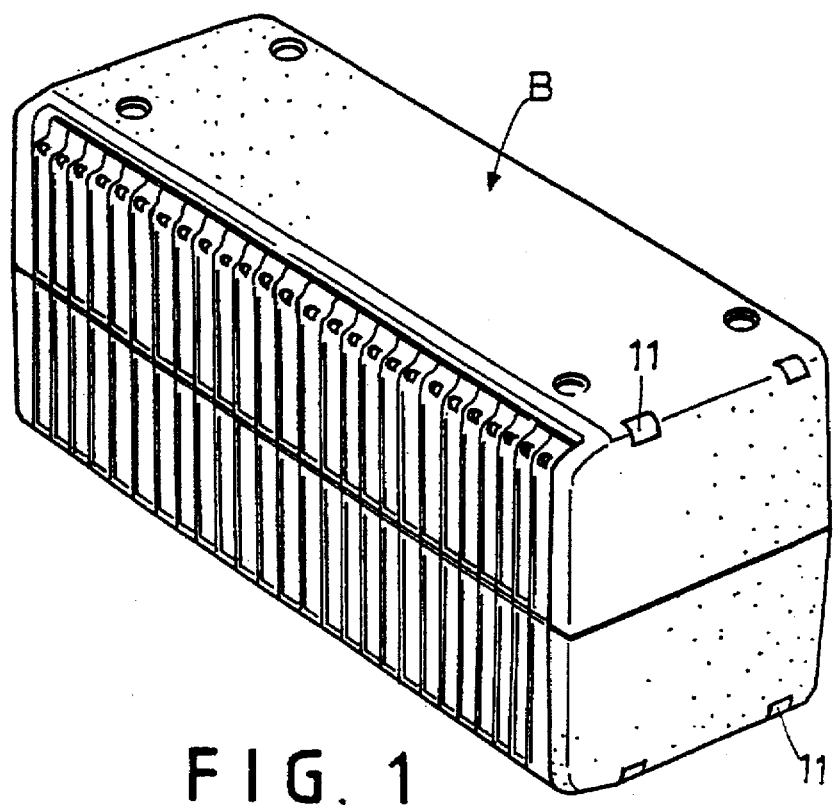
FIG. 1 is a perspective view of the present invention.

For the purpose of promoting an understanding of the principles of the invention, reference will now be made to the embodiment illustrated in the drawings. Specific language will be used to describe same. It will, nevertheless, be understood that no limitation of the scope of the invention is thereby intended, such alterations and further modifications in the illustrated device, and such further applications of the principles of the invention as illustrated herein being contemplated as would normally occur to one skilled in the art to which the invention relates.

With reference to the drawings and in particular to FIGS. 1, 2A, 2B, 2C, 2 and 2E thereof, the compact disk storage device according to the present invention comprises a rectangular casing B which is provided with a plurality of holders 2. The rectangular casing B is formed with two openings 11 at the upper and lower edges of its both ends so that a number of rectangular casings B can be conveniently connected together by connectors 12. Further, a plug 13 may be fitted into the opening 11 as shown in PIG. 2A.

Referring to FIG. 2A, 2B, 2C, 2D and 2E, the casing B includes an upper portion 3 and a lower portion 4 which are open in the front side. The lower edge of both sides of the upper portion 3 is formed with two hook-like members 31 which are adapted to engage with the recesses 41 at the upper edge of both sides of the lower portion 4. The front side of the lower portion 4 is formed at the lower edge with pairs of ears 5. Each pair of ears 5 are provided with two opposite protuberances 51 between which is fitted a lower corner of a holder 2. The front side of the upper portion 3 is formed with two flanges 32 which is larger at the lower end and smaller at the upper end. Similarly, the front side of the lower portion 4 is formed with two flanges 42 which is larger at the larger end and smaller at the lower end. Hence, the holders 2 can be easily turned out of the casing B.

Figure 3:
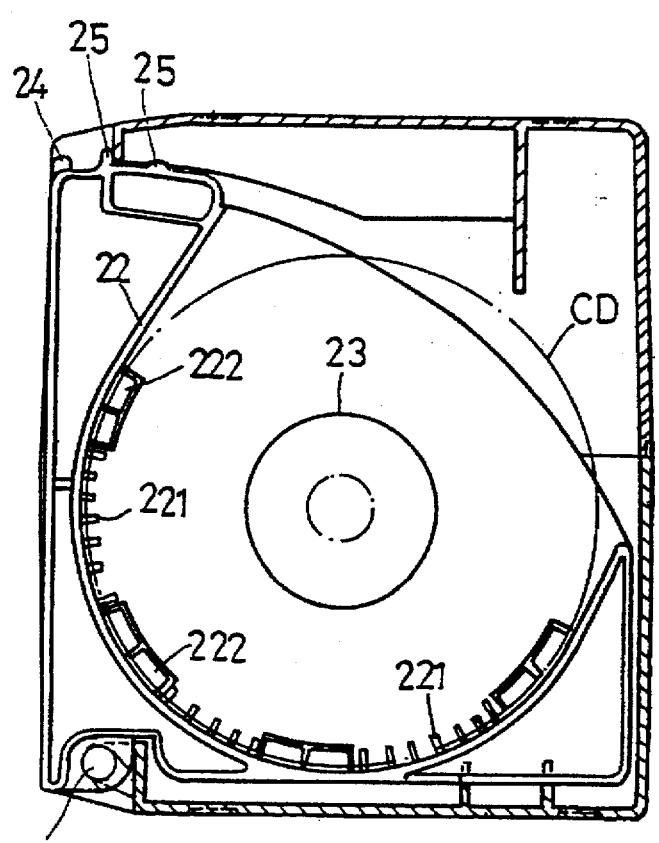
FIG. 3 is a side view of the holder.
Figure 4:
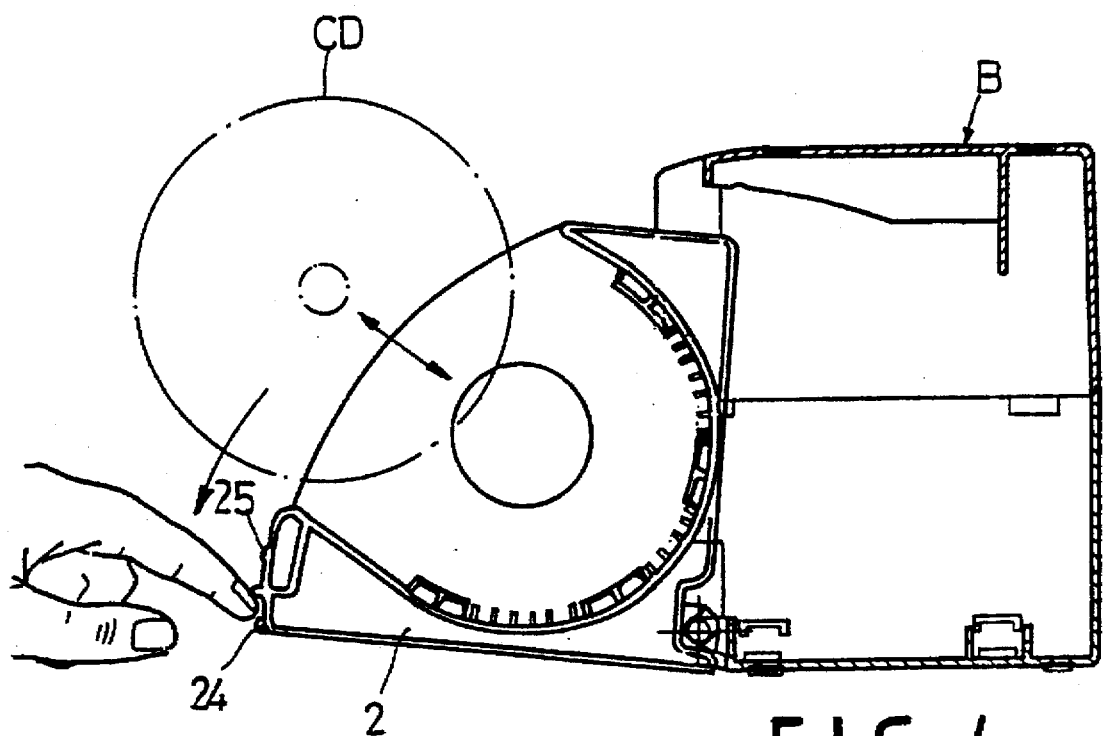
FIG. 4 illustrates the working principle of the present invention.
Figure 5:
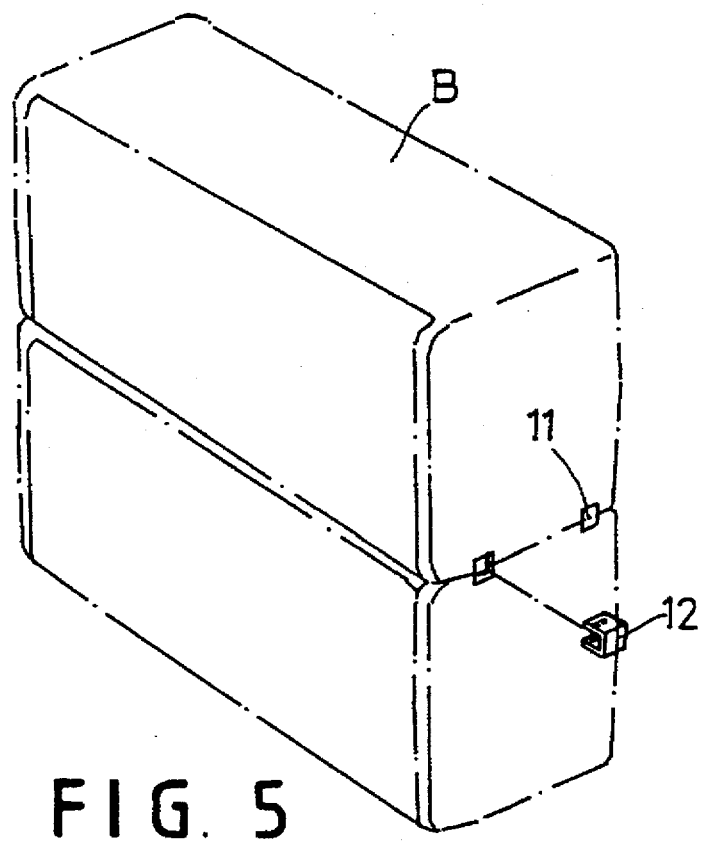
FIGS. 5 and 6 illustrates how to connect two similar CD banks.
Figure 6:
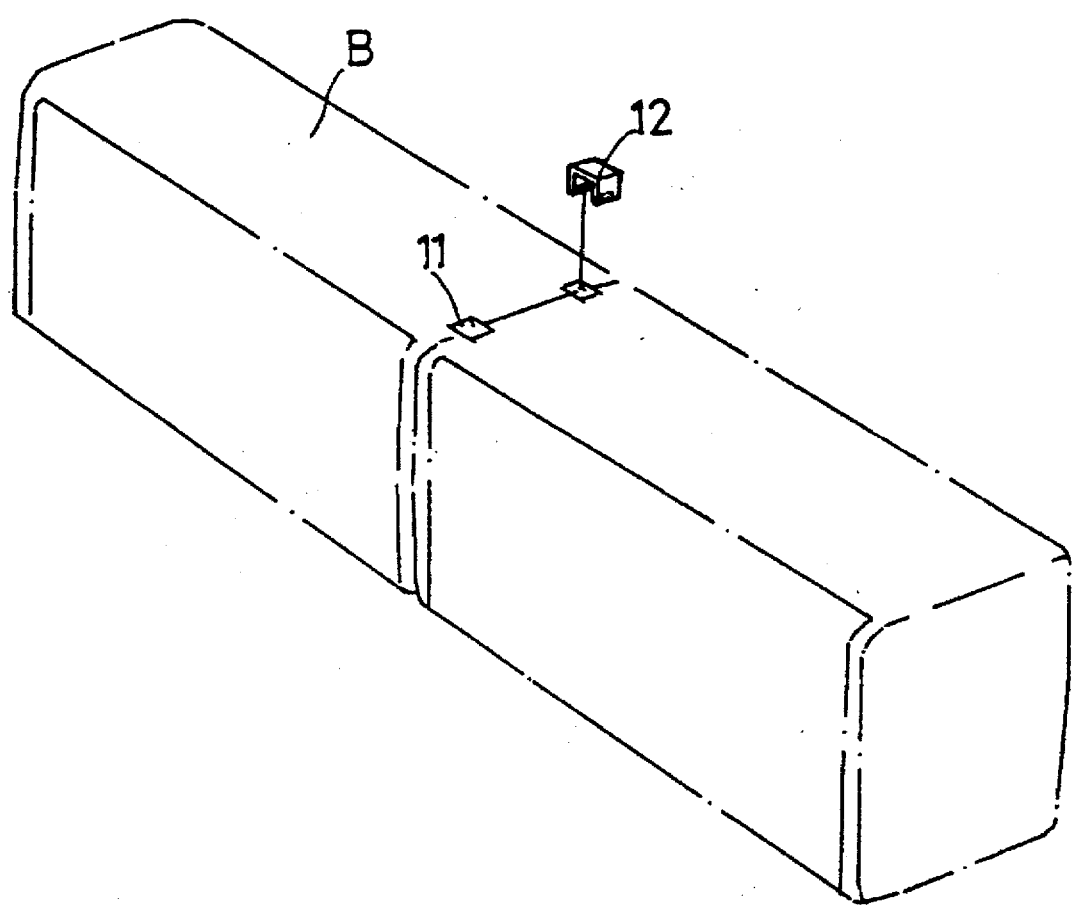
Figure 9:
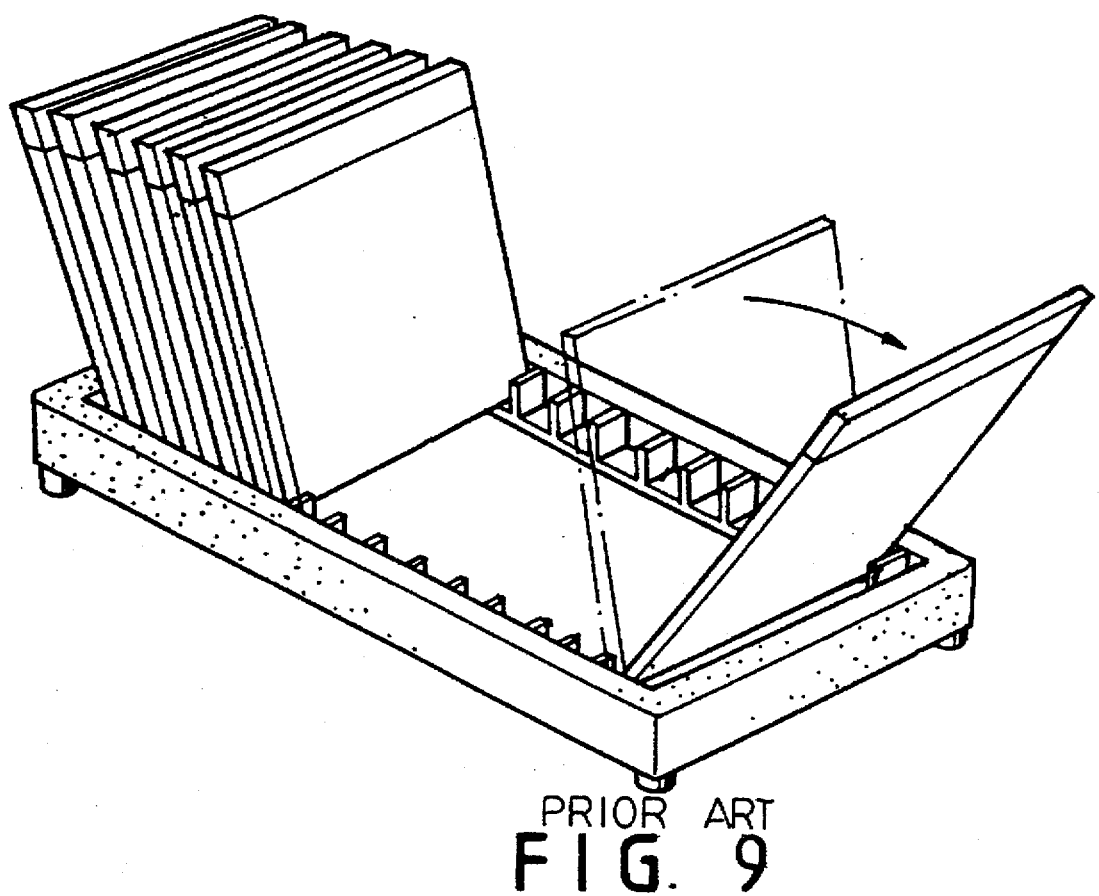
FIG. 9 illustrates a prior art CD storage rack.
Figure 8:
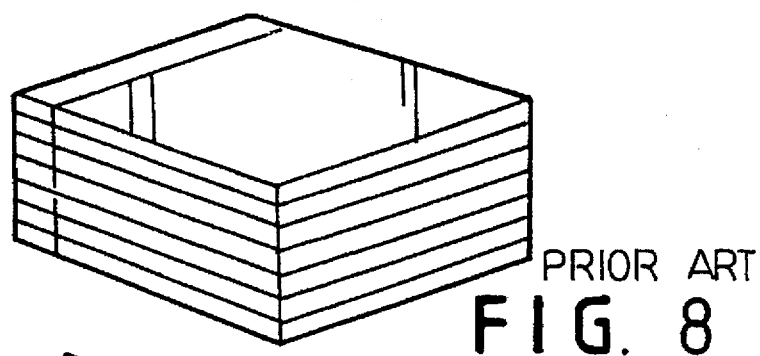
FIG. 8 illustrates a plurality of conventional compact disk cases stacked up together.
Figure 7:
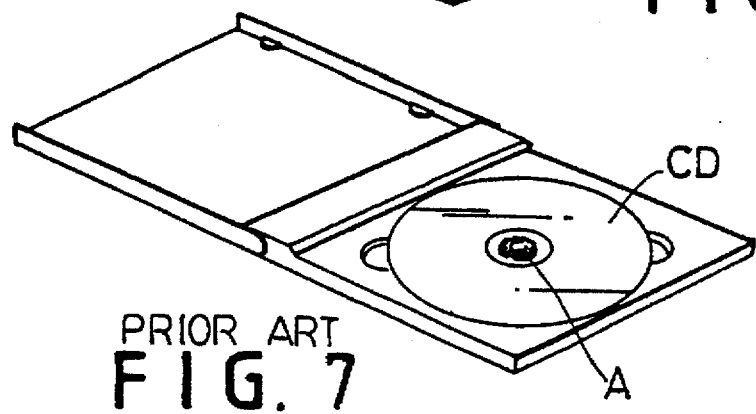
FIG. 7 illustrates a conventional compact disk case.

As shown in FIGS. 2A, 2C and 3, the lower front corner of the holder 2 is formed with a through hole 21 adapted to be fitted between the protuberances 51 of the lugs 5 thereby enabling the holder 2 to be rotated out of respect to the casing B for mounting a compact disk (see FIG. 4). Both sides of the holder 2 are symmetric in structure. Each side of the holder 2 is formed with a half-round recess 22 of a diameter slightly longer than that of an compact disk, an opening 23 at the central portion of the holder 2 for facilitating the removal of a compact disk, a plurality of retaining lugs 222 suspending above the half-round recess 22 and spaced around the periphery and having a beveled edge facing inwards, a plurality of triangular projections 221 spaced around the periphery and having a beveled edge facing outwards, a projection 25 at the top of the holder 2 adapted to engage with a cavity (shown but not numbered) of the upper portion 3 of the casing B for keeping the holder 2 in position, and a protrusion 24 below the projection 25 for facilitating the operation of the holder 2.

The invention is naturally not limited in any sense to the particular features specified in the forgoing or to the details of the particular embodiment which has been chosen in order to illustrate the invention. Consideration can be given to all kinds of variants of the particular embodiment which has been described by way of example and of its constituent elements without thereby departing from the scope of the invention. This invention accordingly includes all the means constituting technical equivalents of the means described as well as their combinations.

I claim:

1. A CD bank comprising:
   a rectangular casing including an upper portion and a lower portion engaged with said upper portion, said lower portion being formed at a lower edge with pairs of ears, each pair of said ears being provided with two opposite protuberances;
   a plurality of holders pivotally connected with a lower edge of said lower portion, each of said holders being symmetric in structure at both sides thereof and being formed with a through hole adapted to be fitted between said protuberances of a respective pair of said ears, each side of said holder being formed with a half-round recess of a diameter slightly longer than that of an compact disk, an opening at a central portion of said holder for facilitating removal of a compact disk, a plurality of retaining lugs suspending above said half-round recess and spaced around a periphery thereof and having a beveled edge facing inwards, a plurality of triangular projections spaced around said periphery and having a beveled edge facing outwards, a projection at a top of said holder adapted to engage with a cavity of said upper portion, and a protrusion below said projection.

2. A CD bank as claimed in claim 1, wherein a front side of said upper portion is formed with two first flanges which are larger at a lower end thereof and smaller at an upper end thereof and a front side of said lower portion is formed with two second flanges which are larger at an upper end thereof and smaller at a lower end thereof.

3. A CD bank as claimed in claim 1, wherein said casing is formed with two openings at an upper and lower edges of both ends thereof so that a number of similar casings can be conveniently connected together by connectors.

* * * * *